United States Patent
Diaz et al.

(10) Patent No.: US 8,640,785 B2
(45) Date of Patent: Feb. 4, 2014

(54) FLUID CONTROL SYSTEM FOR STEERABLE AGRICULTURAL IMPLEMENT

(75) Inventors: Ricardo Diaz, Westchester, IL (US); Leonard A. Bettin, LaGrange Park, IL (US)

(73) Assignee: CNH America LLC, New Holland, PA (US)

(*) Notice: Subject to any disclaimer, the term of this patent is extended or adjusted under 35 U.S.C. 154(b) by 678 days.

(21) Appl. No.: 12/825,778

(22) Filed: Jun. 29, 2010

(65) Prior Publication Data

US 2011/0315234 A1 Dec. 29, 2011

(51) Int. Cl.
*A01B 69/00* (2006.01)

(52) U.S. Cl.
USPC ............................................. 172/278

(58) Field of Classification Search
USPC ......... 172/278, 286, 288, 289, 290, 383, 384, 172/386, 395, 400, 401, 406
See application file for complete search history.

(56) References Cited

U.S. PATENT DOCUMENTS

| | | | |
|---|---|---|---|
| 2,174,493 A | 9/1939 | Vanderwerf | |
| 3,212,793 A | 10/1965 | Pietroroia | |
| 3,229,986 A | 1/1966 | Ferris | |
| 3,291,503 A | 12/1966 | De Lay | |
| 3,454,285 A | 7/1969 | Peursem | |
| 3,703,932 A | 11/1972 | Tuttle et al. | |
| 4,180,133 A | 12/1979 | Collogan et al. | |
| 4,228,860 A * | 10/1980 | Orthman | 172/26 |
| 4,272,097 A * | 6/1981 | Cornelius | 172/311 |
| 4,496,004 A * | 1/1985 | Frase et al. | 172/311 |
| 4,552,375 A | 11/1985 | Kinzenbaw | |
| 4,930,581 A * | 6/1990 | Fleischer et al. | 172/6 |
| 5,244,226 A | 9/1993 | Bergh | |
| 5,255,756 A | 10/1993 | Follmer et al. | |
| 5,261,497 A | 11/1993 | Snyder et al. | |
| 5,329,451 A * | 7/1994 | Notsu | 701/41 |
| 6,179,315 B1 | 1/2001 | Boriack | |
| 6,290,248 B1 | 9/2001 | Yrigoyen | |
| 6,431,576 B1 | 8/2002 | Viaud et al. | |
| 6,443,079 B1 | 9/2002 | Horsch | |
| 6,631,916 B1 | 10/2003 | Miller | |
| 7,147,241 B2 | 12/2006 | Beaujot et al. | |
| 7,310,929 B2 | 12/2007 | Dow et al. | |
| 7,373,231 B2 | 5/2008 | McClure et al. | |
| 2008/0246253 A1 | 10/2008 | Timmons | |
| 2009/0184491 A1 | 7/2009 | Neudorf et al. | |

(Continued)

FOREIGN PATENT DOCUMENTS

EP 0653343 5/1995

*Primary Examiner* — Thomas B Will
*Assistant Examiner* — Joel F. Mitchell
(74) *Attorney, Agent, or Firm* — Rebecca L. Henkel

(57) ABSTRACT

An agricultural implement system is provided that includes a valve in fluid communication with first and second actuating cylinders and with first and second fluid conduits. The valve is configured to control fluid flow from the first and second fluid conduits to the first and second actuating cylinders. Furthermore, a controller is communicatively coupled to first and second pressure sensors and to the valve. The first pressure sensor is coupled to the first fluid conduit, and the second pressure sensor is coupled to the second fluid conduit. The controller is configured to determine whether the first fluid conduit or the second fluid conduit is supplying fluid to the valve based on signals from the first and second pressure sensors, and to automatically control fluid flow to the first and second actuating cylinders such that wheel assemblies are rotated to a desired angle relative to an implement frame.

20 Claims, 9 Drawing Sheets

(56) References Cited

U.S. PATENT DOCUMENTS

| | | |
|---|---|---|
| 2009/0272551 A1 | 11/2009 | Thompson et al. |
| 2009/0273160 A1 | 11/2009 | Friggstad et al. |
| 2011/0202232 A1* | 8/2011 | Busch et al. ............. 701/36 |
| 2011/0231069 A1* | 9/2011 | Ryder et al. ............. 701/50 |

* cited by examiner

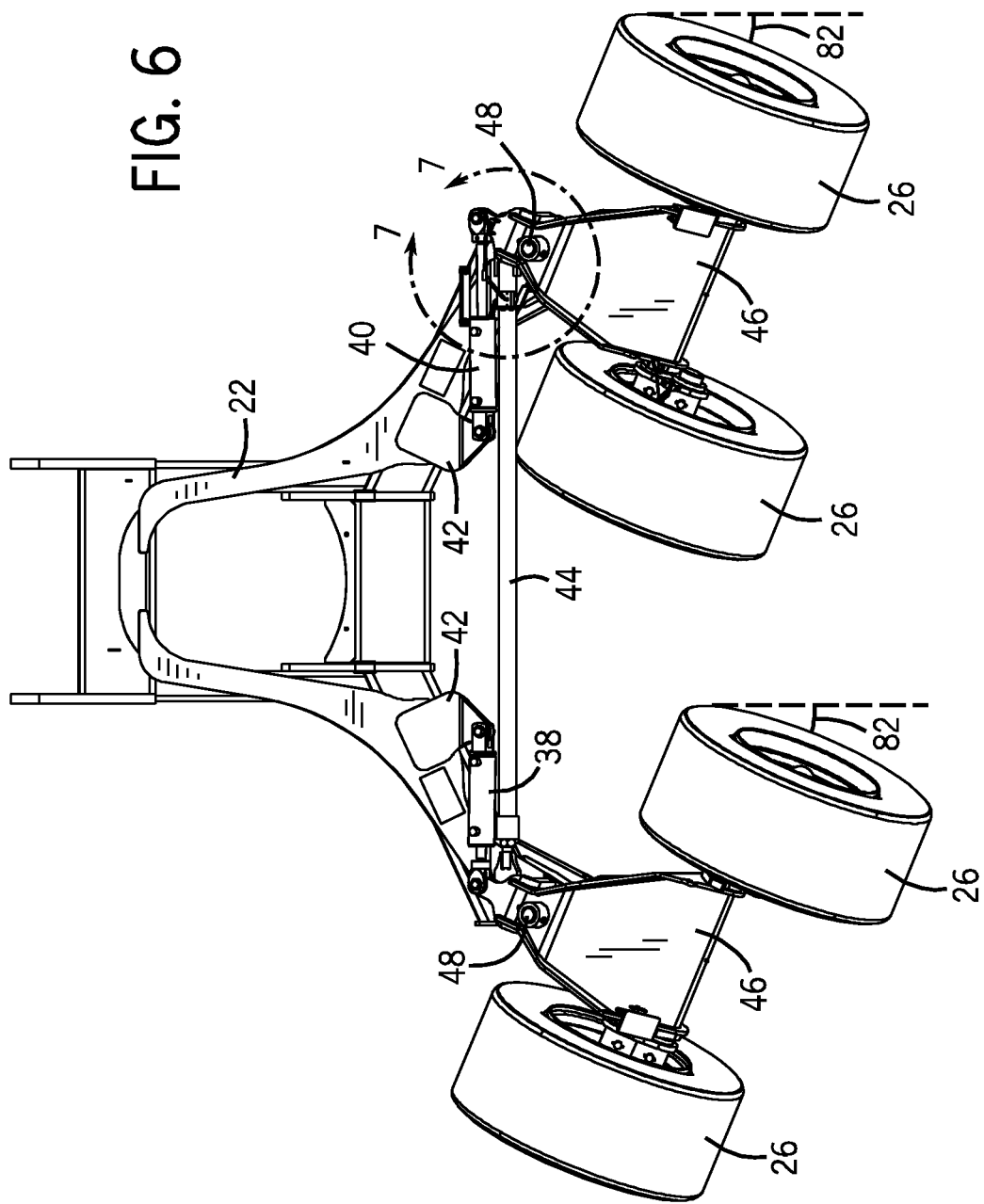

FLUID CONTROL SYSTEM FOR STEERABLE AGRICULTURAL IMPLEMENT

BACKGROUND

The invention relates generally to ground working equipment, such as agricultural equipment, and more specifically, to a fluid control system for a steerable agricultural implement.

A wide range of farm implements have been developed and are presently in use for tilling, planting, harvesting, and so forth. Seeders or planters, for example, are commonly towed behind tractors and may cover wide swaths of ground which may be tilled or untilled. Such devices typically open the soil, dispense seeds in the opening, and close the soil in a single operation. Seeds are commonly dispensed from seed tanks and distributed to row units by a distribution system. To make the seeding operation as efficient as possible, very wide swaths may be covered by extending wings on either side of a central section of the implement pulled by the tractor. Included in the wing assemblies are tool bars, row units mounted thereon, and support wheels. The wings and row units are commonly disposed in a "floating" arrangement during the planting operation, wherein hydraulic cylinders allow the implement to contact the soil with sufficient force to open the soil, dispense the seeds and close the soil. For transport, the wings may be elevated and folded forward to reduce the width of the implement.

In certain configurations, an extendable hitch is employed to accommodate the folded length of the wings. Specifically, the hitch extends forward to increase the length of the implement and to provide sufficient space for the folded wings. As will be appreciated, the increased implement length places the ground engaging wheels farther from the hitch, thereby increasing the turning radius of the implement. The larger turning radius may complicate the process of maneuvering the implement through turns, such as when turning off a narrow road and/or through a narrow pass into a field, or when maneuvering through other tight spots.

BRIEF DESCRIPTION

The present invention provides a steerable agricultural implement having a fluid control system configured to automatically identify a fluid supply conduit and a fluid return conduit, and to facilitate automatic centering and/or automatic steering of wheel assemblies. In an exemplary embodiment, an agricultural implement system includes a first actuating cylinder configured to rotate a first wheel assembly relative to an implement frame, and a second actuating cylinder configured to rotate a second wheel assembly relative to the implement frame. The agricultural implement system also includes a first fluid conduit configured to supply or return fluid, and a second fluid conduit configured to supply or return fluid. In addition, the agricultural implement system includes a first pressure sensor in fluid communication with the first fluid conduit. The first pressure sensor is configured to output a first signal indicative of a pressure within the first fluid conduit. The agricultural implement system also includes a second pressure sensor in fluid communication with the second fluid conduit. The second pressure sensor is configured to output a second signal indicative of a pressure within the second fluid conduit. Furthermore, the agricultural implement system includes a valve in fluid communication with the first and second actuating cylinders and the first and second fluid conduits. The valve is configured to control fluid flow from the first and second fluid conduits to the first and second actuating cylinders. The agricultural implement system also includes a controller communicatively coupled to the first and second pressure sensors and to the valve. The controller is configured to determine whether the first fluid conduit or the second fluid conduit is supplying fluid to the valve based on the first and second signals, and to automatically control fluid flow to the first and second actuating cylinders such that the first and second wheel assemblies are rotated to a desired angle relative to the implement frame.

DRAWINGS

These and other features, aspects, and advantages of the present invention will become better understood when the following detailed description is read with reference to the accompanying drawings in which like characters represent like parts throughout the drawings, wherein:

FIG. 6 is a top view of the carrier frame, wheel assemblies and actuating cylinders, as shown in FIG. 3, in which the wheel assemblies are oriented to steer the agricultural implement in a left turn;

DETAILED DESCRIPTION

Figure 1:
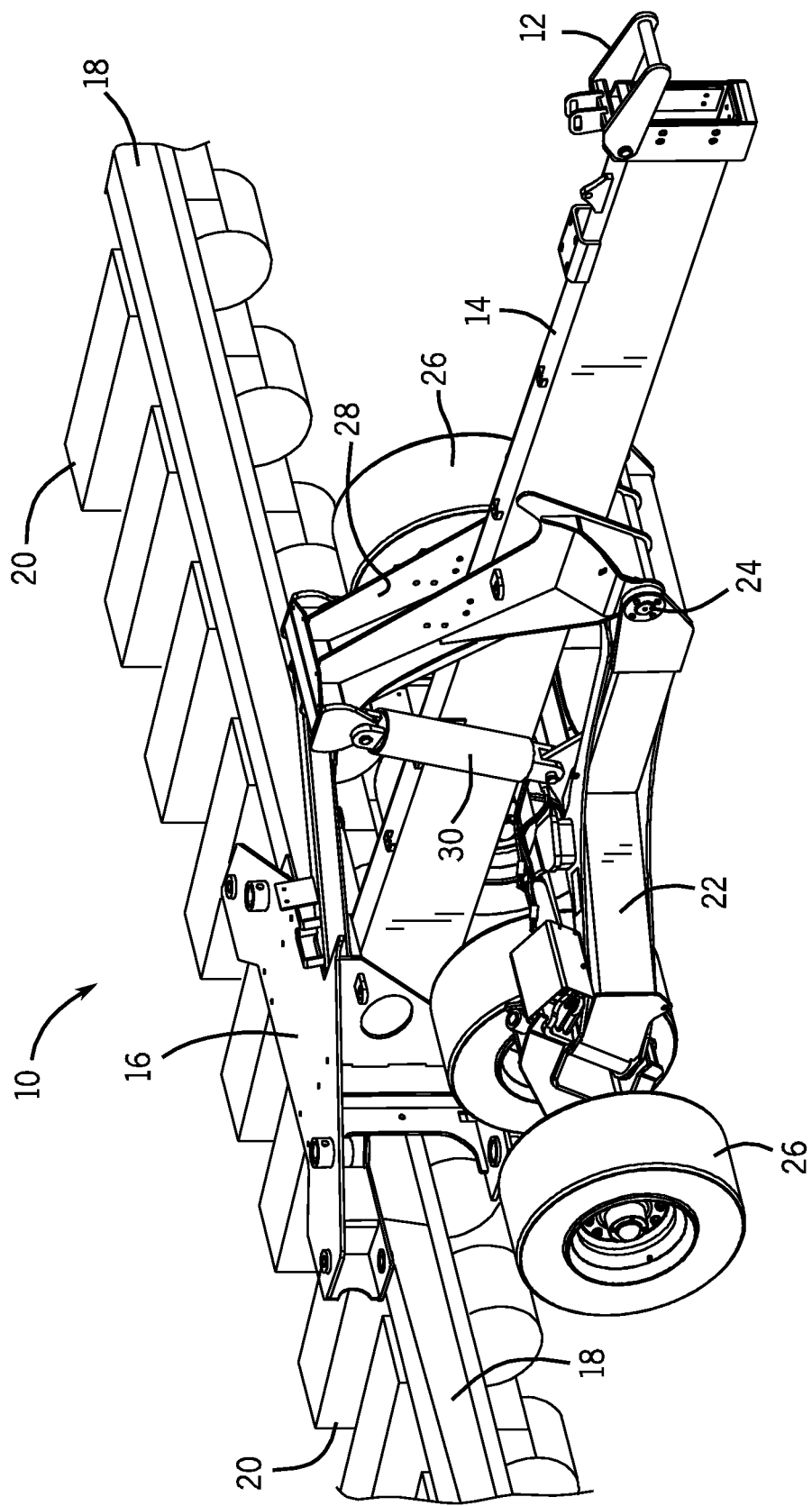
FIG. 1 is a perspective view of an agricultural implement in a working position, including actuating cylinders configured to steer the agricultural implement during operation.

Turning now to the drawings, FIG. 1 is a perspective view of an agricultural implement 10 in a working position. The implement 10 is designed to be towed behind a prime mover such as a tractor. The implement includes a tow hitch 12 which is coupled to a hitch assembly 14. The tow hitch 12 may be used to attach the implement 10 to a tractor and may be pivotally coupled to the hitch assembly 14 to facilitate flexibility as the implement changes elevation as it is towed across a field. A toolbar mounting structure 16 is coupled to the hitch assembly 14, and configured to pivotally secure toolbars 18. In the illustrated working position, the toolbars extend laterally outward from the mounting structure 16. Multiple row units 20, configured to deposit seeds and/or fertilizer into soil, are coupled to the toolbars 18. In the present embodiment, the toolbars 18 are configured to fold forward when the implement 10 is in a transport position. When in the transport position, the toolbars 18 are generally parallel to the hitch assembly 14. Furthermore, as discussed in detail below, the row units 20 are raised above the ground while the implement 10 is in the transport position.

As illustrated, a carrier frame 22 is rotatably coupled to the hitch assembly 14 by a pivot joint 24. Ground engaging wheels 26 are coupled to the carrier frame 22 to support the weight of the implement 10 during both operation and transport. In addition, a support frame 28 is coupled to the hitch assembly 14, and configured to support the carrier frame 22. Specifically, main lift cylinders 30 extend between the support frame 28 and the carrier frame 22. In the illustrated working position, the main lift cylinders 30 are in a retracted position such that the hitch assembly 14 is lowered relative to the carrier frame 22, thereby inducing the row units 20 to engage the soil. As discussed in detail below, the main lift cylinders 30 may extend to raise the row units 20 above the ground, thereby transitioning the implement into a transport position.

As discussed in detail below, the implement 10 includes a fluid control system configured to automatically identify a fluid supply conduit and a fluid return conduit, and to facilitate automatic centering and/or automatic steering of wheel assemblies. In an exemplary embodiment, the implement 10 includes a first actuating cylinder configured to rotate a first wheel assembly relative to the carrier frame 22, and a second actuating cylinder configured to rotate a second wheel assembly relative to the carrier frame 22. The implement 10 also includes a first fluid conduit configured to supply or return fluid, and a second fluid conduit configured to supply or return fluid. In addition, the implement 10 includes a first pressure sensor in fluid communication with the first fluid conduit. The first pressure sensor is configured to output a first signal indicative of a pressure within the first fluid conduit. The implement 10 also includes a second pressure sensor in fluid communication with the second fluid conduit. The second pressure sensor is configured to output a second signal indicative of a pressure within the second fluid conduit. Furthermore, the implement 10 includes a valve in fluid communication with the first and second actuating cylinders and the first and second fluid conduits. The valve is configured to control fluid flow from the first and second fluid conduits to the first and second actuating cylinders. The implement 10 also includes a controller communicatively coupled to the first and second pressure sensors and to the valve. The controller is configured to determine whether the first fluid conduit or the second fluid conduit is supplying fluid to the valve based on the first and second signals, and to automatically control fluid flow to the first and second actuating cylinders such that the first and second wheel assemblies are rotated to a desired angle relative to the carrier frame 10.

In certain embodiments, the controller is configured to operate the fluid control system in one of three modes. The first mode locks the wheel assemblies into an orientation substantially aligned with the longitudinal axis of the implement 10. The second mode enables manual steering of the wheel assemblies via operator control of a hydraulic supply within a tow vehicle. The third mode automatically steers the wheels based on an orientation of the implement relative to the tow vehicle. In further embodiments, the controller is configured to automatically center the wheel assemblies based on operator input and/or implement speed. For example, if the speed of the implement exceeds a threshold speed, the controller may disable manual control, and automatically center the wheel assemblies. Such embodiments may ensure that the operator does not attempt to manually steer the implement at a speed that may destabilize the implement 10.

Figure 2:
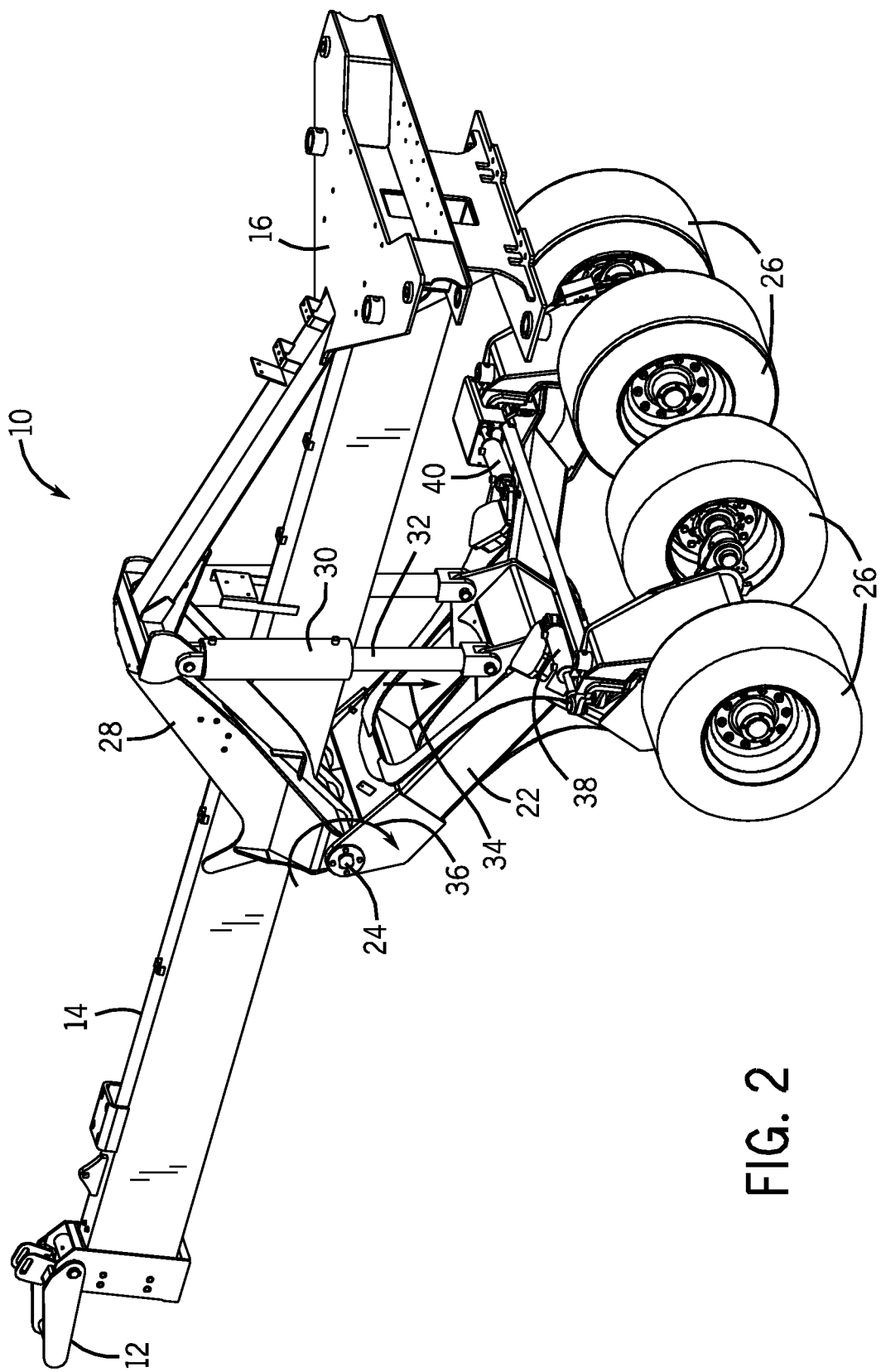
FIG. 2 is a perspective view of the agricultural implement, as shown in FIG. 1, in a transport position.

FIG. 2 is a perspective view of the agricultural implement 10 in a transport position. As illustrated, the main lift cylinders 30 are in an extended position to raise the hitch assembly 14 above the ground. In the present configuration, the main lift cylinders 30 are hydraulically operated and include a piston rod 32 which extends from the cylinder 30. As the rod 32 extends in the direction 34, the carrier frame 22 is driven to rotate in the direction 36 about the pivot joint 24. In this manner, the hitch assembly 14 is raised, thereby raising the row units 20 above the level of the soil. Furthermore, a first actuating cylinder 38 and a second actuating cylinder 40 are coupled to the carrier frame 22. As discussed in detail below, the actuating cylinders 38 and 40 are configured to rotate the wheels 26, thereby steering the implement 10.

Figure 3:
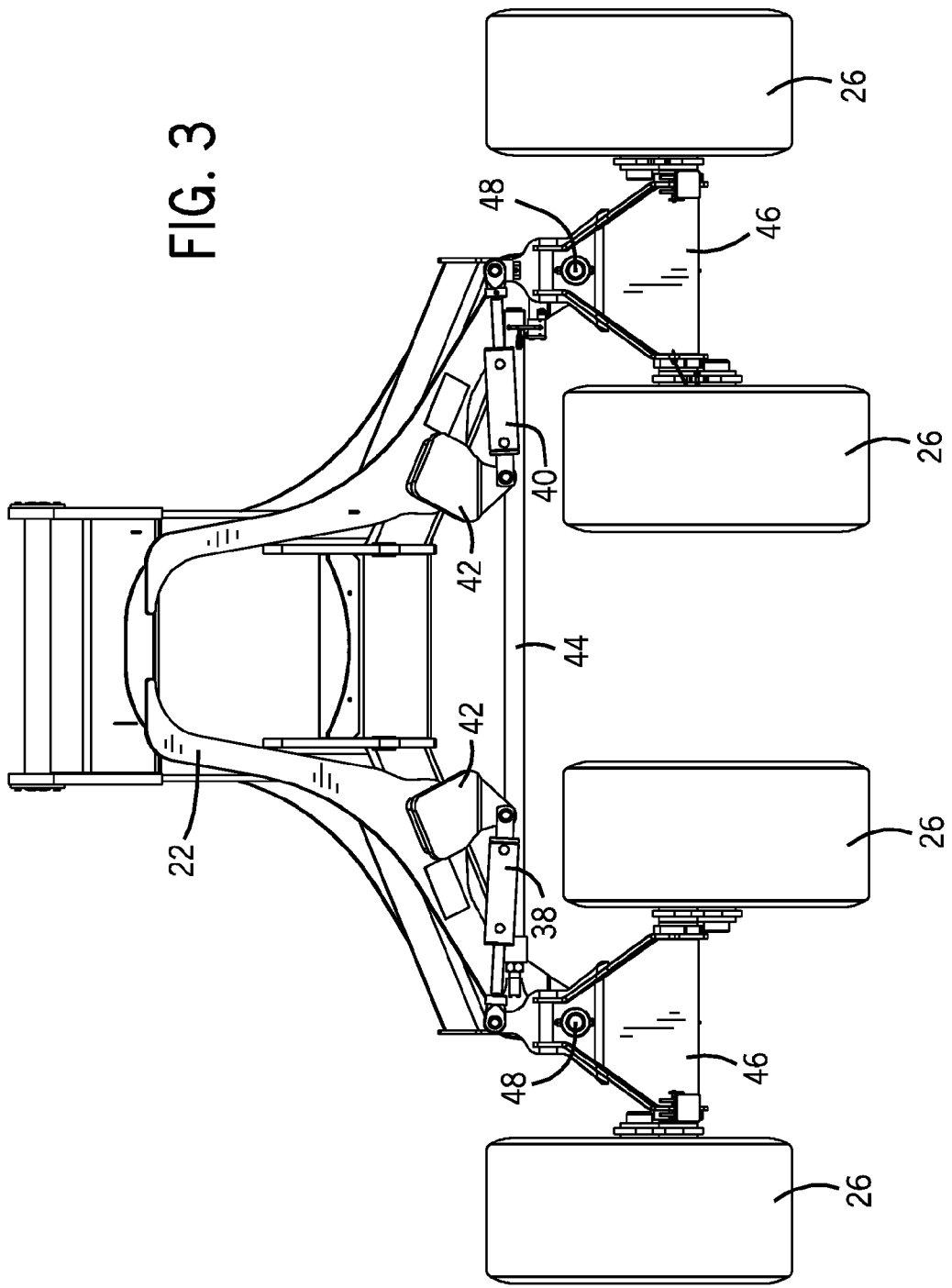
FIG. 3 is a top view of a carrier frame, wheel assemblies and actuating cylinders of the agricultural implement shown in FIG. 1.

FIG. 3 is a top view of the carrier frame 22, wheel assemblies 46 and actuating cylinders 38 and 40 of the agricultural implement 10. As illustrated, the carrier frame 22 includes a pair of mounting brackets 42 configured to support the actuating cylinders 38 and 40, such as the illustrated hydraulic cylinders. As discussed in detail below, the combination of the hydraulic cylinders 38 and 40 and a tie rod 44 may facilitate equalized steering effort for turning the implement in both the left and right directions. As illustrated, each hydraulic cylinder 38 and 40 extends between the carrier frame 22 and a respective wheel assembly 46, and the tie rod 44 extends between the wheel assemblies 46. The hydraulic cylinders 38 and 40 are configured to rotate each wheel assembly 46 about a pivot joint 48, while the tie rod 44 is configured to ensure that the wheel assemblies 46 rotate together by transferring torque between assemblies 46.

As discussed in detail below, a left turn may be initiated by extending a piston rod of the second hydraulic cylinder 40 positioned on the right side of the carrier frame 22, thereby inducing the right wheel assembly 46 to rotate in a clockwise direction about the right pivot joint 48. At the same time, a piston rod of the first hydraulic cylinder 38 positioned on the left side of the carrier frame 22 is retracted causing the left wheel assembly 46 to rotate in a clockwise direction. In the present configuration, the tie rod 44 serves to transfer torque between wheel assemblies 46, thereby inducing both wheel assemblies 46 to rotate together. In other words, during a turn, the angle of the right wheel assembly 46 and the angle of the left wheel assembly 46 relative to the carrier frame 22 will be substantially equal. Similarly, during a right turn, the tie rod 44 will ensure that both the left and right wheel assemblies rotate together. Therefore, the present embodiment may enable the implement 10 to turn in both the left and right directions at a substantially equal rate.

Figure 4:
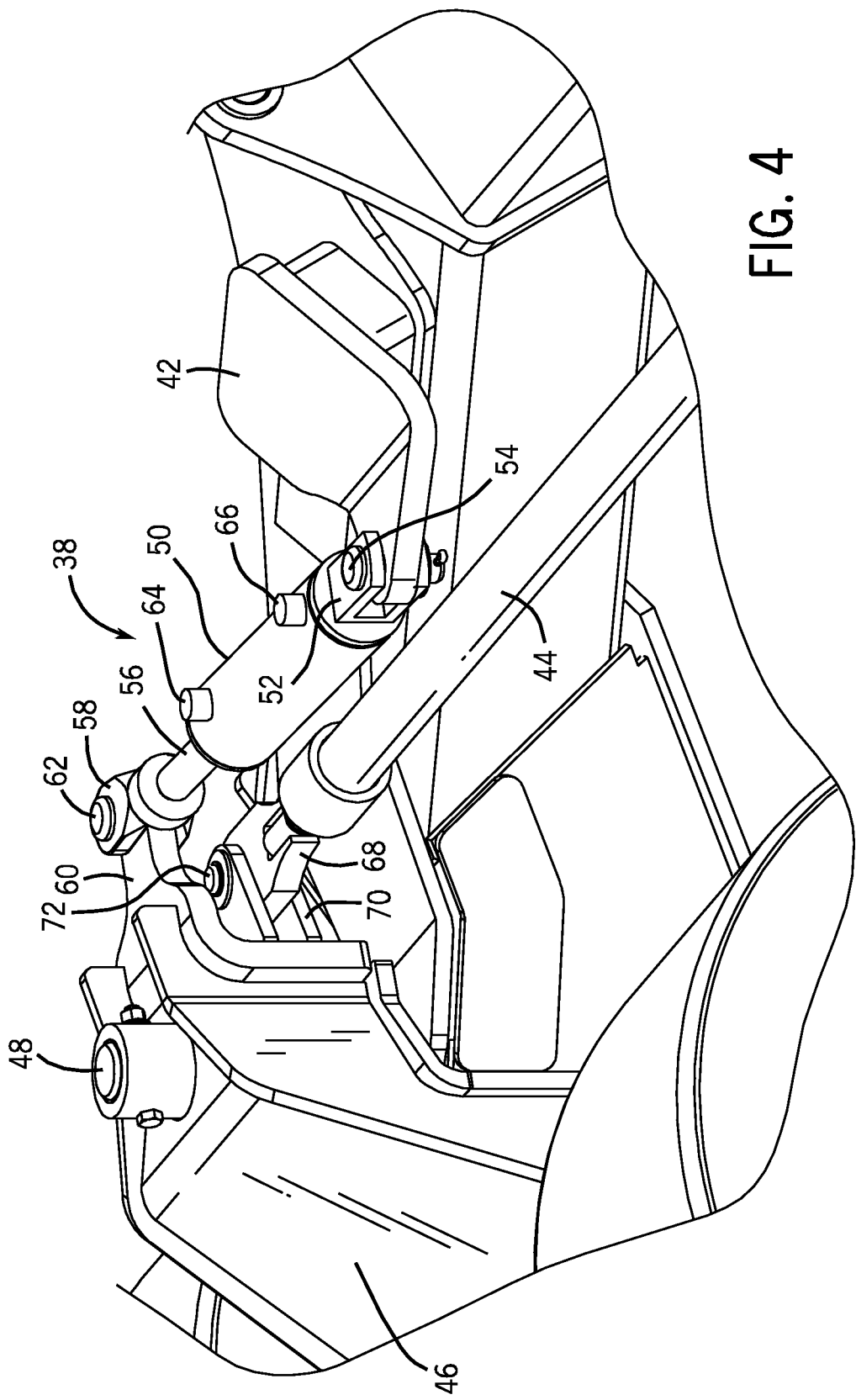
FIG. 4 is a perspective view of a first actuating cylinder, as shown in FIG. 3, illustrating the coupling of the first actuating cylinder to the carrier frame and a first wheel assembly.

FIG. 4 is a perspective view of the first hydraulic cylinder 38 illustrating the coupling of the hydraulic cylinder 38 to the carrier frame 22 and a first (e.g., left) wheel assembly 46. As illustrated, the hydraulic cylinder 38 includes a barrel 50 and a first clevis 52 coupled to one end of the barrel 50. A pin 54 passes through openings within the clevis 52 and a corresponding opening within the mounting bracket 42 to secure the hydraulic cylinder 38 to the mounting bracket 42. The hydraulic cylinder 38 also includes a piston rod 56. As previously discussed, the piston rod 56 is coupled to a piston within the hydraulic cylinder 38. Consequently, when a hydraulic fluid pressure differential induces the piston to translate within the barrel 50, the piston rod 56 is driven to extend or retract relative to the barrel 50. A second clevis 58 is coupled to the piston rod 56, and serves to secure the piston rod 56 to a mounting bracket 60 of the wheel assembly 46.

Specifically, a pin 62 is disposed through openings within the clevis 58 and a corresponding opening within the mounting bracket 60, thereby securing the hydraulic cylinder 38 to the wheel assembly 46.

In the present configuration, the hydraulic cylinder includes a first port 64 and a second port 66. These ports 64 and 66 serve to couple the hydraulic cylinder 38 to conduits configured to deliver hydraulic fluid to the hydraulic cylinder 38. Specifically, the first port 64 is positioned on the rod side of the piston. In typical hydraulic cylinders, the piston rod 56 passes through a gland coupled to the barrel 50 on the end opposite from the first clevis 52. The gland, in combination with one or more seals, serves to contain hydraulic fluid within a volume defined by the barrel 50, the piston and the gland. Providing hydraulic fluid to this volume on the rod side of the piston, causes the piston to drive the rod 56 into the barrel 50, thereby inducing the wheel assembly 46 to rotate clockwise. Conversely, by applying hydraulic fluid to the second port 66, the rod 56 is driven to extend from the barrel 50, thereby inducing the wheel assembly 46 to rotate counter-clockwise. Specifically, the second port 66 serves to couple a hydraulic conduit to a cap side of the piston. By providing hydraulic fluid to the cap side, the piston is driven away from the first clevis 52, thereby driving the piston rod 56 to extend from the barrel 50.

As previously discussed, the tie rod 44 is coupled to the wheel assembly 46 and serves to transfer torque between the right and left wheel assemblies. As illustrated, a tang 68 coupled to the tie rod end is secured to a clevis 70 of the wheel assembly 46. Specifically, a pin 72 passes through openings within the clevis 70 and a corresponding opening within the tang 68 to secure the tie rod 44 to the wheel assembly 46. Consequently, the tie rod 44 serves to ensure that the left and right wheel assemblies 46 rotate together despite force variations between the hydraulic cylinders 38 and 40.

Figure 5:
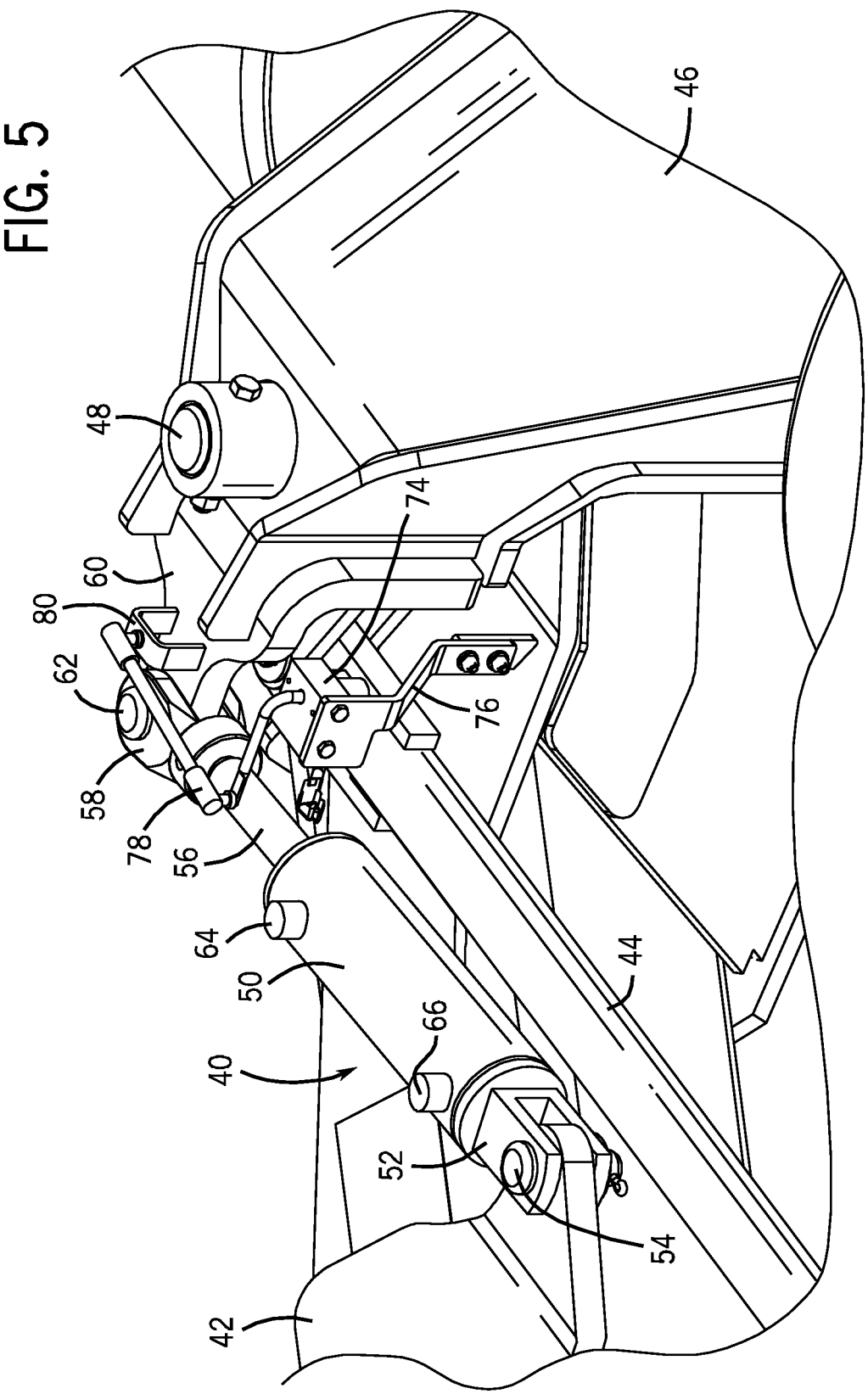
FIG. 5 is a perspective view of a second actuating cylinder, as shown in FIG. 3, illustrating the coupling of the second actuating cylinder to the carrier frame and a second wheel assembly.

FIG. 5 is a perspective view of the second hydraulic cylinder 40 illustrating the coupling of the cylinder 40 to the carrier frame 22 and a second (e.g., right) wheel assembly 46. As illustrated, the configuration of the hydraulic cylinder 40, tie rod 44, and wheel assembly 46 is substantially similar to the configuration shown in FIG. 4. However, the right wheel assembly includes a sensor 74 configured to detect an angle of the wheel assembly 46 relative to the carrier frame 22. In the present configuration, the sensor 74 is a non-contact potentiometer. However, as will be appreciated, the sensor 74 may include any suitable device capable of measuring a position of the wheel assembly 46 relative to the carrier frame 22. The sensor 74 is mounted to the carrier frame 22 by a support bracket 76. A linkage 78 couples the sensor 74 to a mounting bracket 80 of the wheel assembly 46. As discussed in detail below, as the wheel assembly rotates, the sensor 74 detects movement of the linkage 78, and then outputs a signal indicative of the degree of rotation.

In certain embodiments, the sensor 74 is coupled to a controller configured to control valving for directing hydraulic fluid to each cylinder 38 and 40 based on the output signal from the sensor 74. For example, when an operator initiates a turn, the controller may cause directional control valving to apply hydraulic fluid to the hydraulic cylinders 38 and 40 until a desired angle of the wheel assemblies 46 relative to the carrier frame 22 or prime mover is achieved. In this manner, the controller may automatically rotate the wheel assemblies 46 to a desired angle based on output from the sensor 74. While the present configuration employs hydraulic cylinders 38 and 40 with the piston rods 56 coupled to the wheel assemblies 46 and the barrels 50 coupled to the carrier frame 22, it should be appreciated that alternative embodiments may employ hydraulic cylinders with the piston rods 56 coupled to the carrier frame 22 and the barrels 50 coupled to the wheel assemblies 46. However, in either configuration, the piston rod 56 of each hydraulic cylinder 38 and 40 should face in substantially opposite lateral directions.

FIG. 6 is a top view of the carrier frame 22, wheel assemblies 46 and hydraulic cylinders 38 and 40, in which the wheel assemblies 46 are oriented to steer the agricultural implement 10 in a left turn. As illustrated, the wheel assemblies 46 are oriented at an angle 82 relative to the carrier frame 22. In the illustrated embodiment, the angle is approximately 25 degrees. In certain embodiments, the wheel assemblies 46 may be capable of rotating between approximately 0 to 60, 0 to 50, 0 to 40, or about 0 to 30 degrees. In this manner, the cylinders 38 and 40 may steer the implement 10 to a desired orientation based on user input or automatically based on rotation relative to the tow vehicle. As illustrated, because the wheel assemblies 46 are linked by the tie rod 44, the rotation angle 82 of each wheel assembly 46 relative to the carrier frame 22 is substantially equal.

Figure 7:
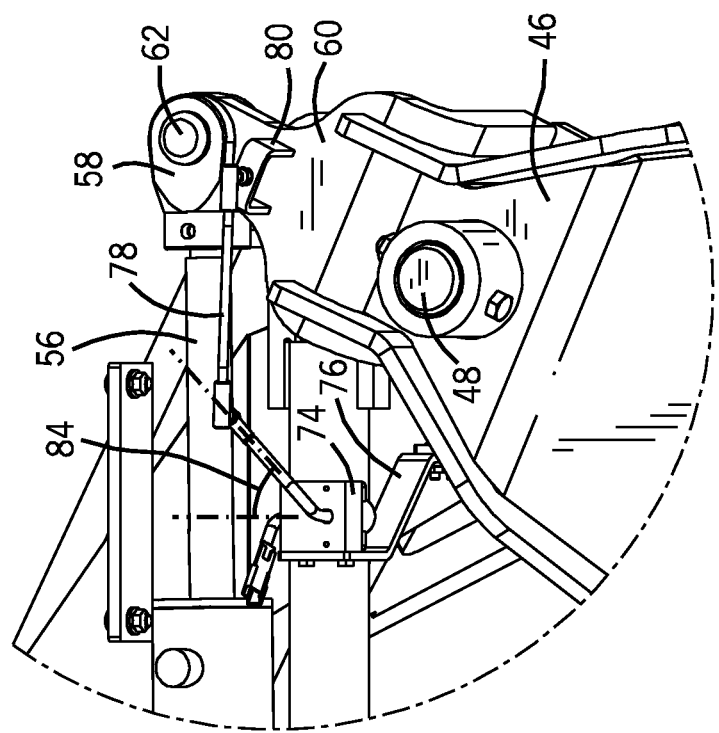
FIG. 7 is a detailed top view of the carrier frame, wheel assemblies and the second actuating cylinder, taken within line 7-7 of FIG. 6.

FIG. 7 is a detailed top view of the carrier frame 22, wheel assemblies 46 and the second hydraulic cylinder 40 taken within line 7-7 of FIG. 6. As illustrated, when the implement 10 engages a left turn, the wheel assemblies 46 rotate in a clockwise direction about the pivot joints 48. Consequently, the bracket 80 translates to the right, thereby inducing the linkage to rotate clockwise with respect to the sensor 74. As illustrated, the linkage 78 forms an angle 84 with respect to the non-rotated orientation. The sensor 74 is configured to output a signal based on the angle 84, which is indicative of the angle 82. In the illustrated embodiment, the angle 84 corresponds to an angle 82 of approximately 25 degrees. Consequently, when the sensor 74 detects an angle 84 of the linkage, it will output a signal indicative of a 25 degree clockwise rotation of the wheel assembly 46.

Figure 8:
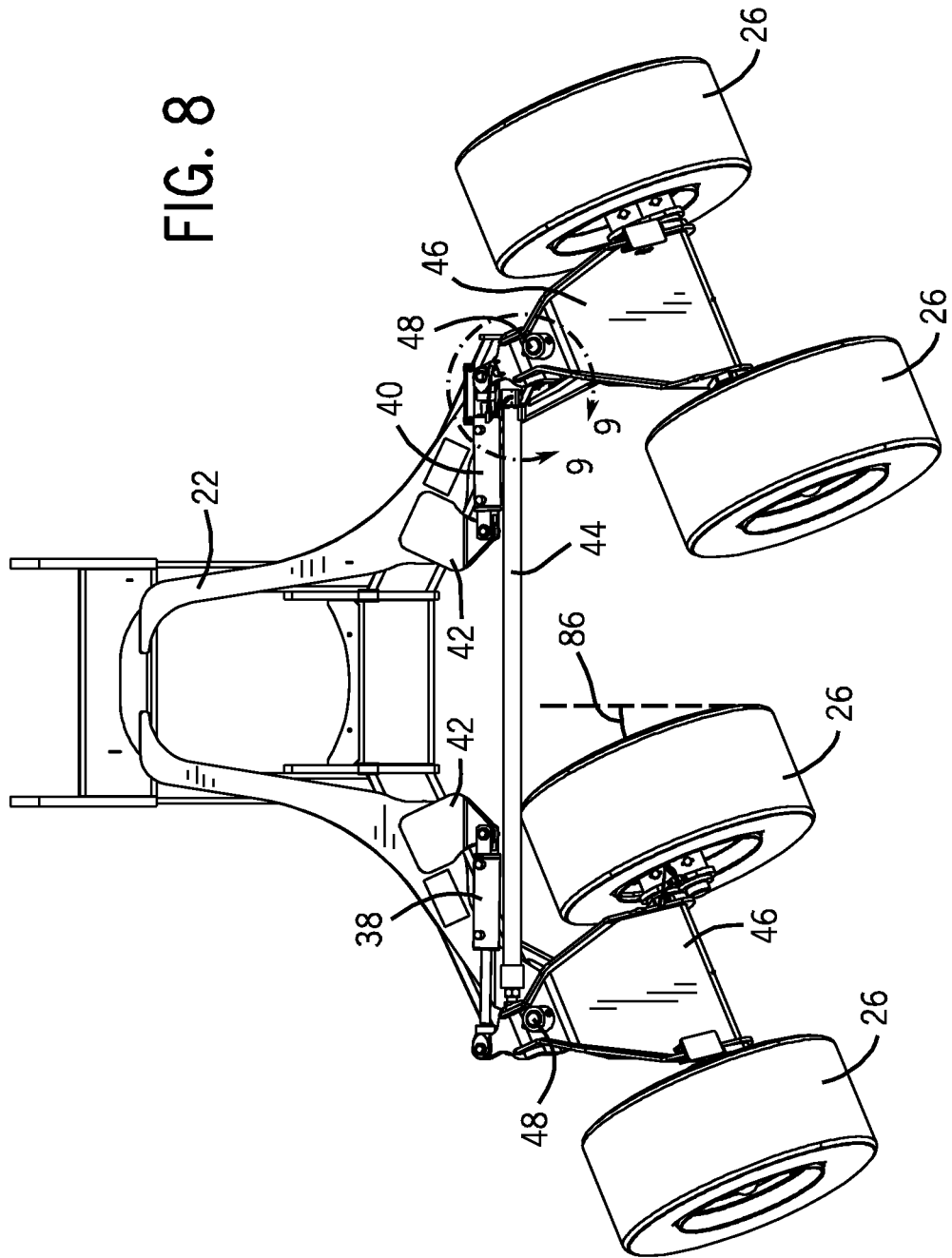
FIG. 8 is a top view of the carrier frame, wheel assemblies and actuating cylinders, as shown in FIG. 3, in which the wheel assemblies are oriented to steer the agricultural implement in a right turn.

FIG. 8 is a top view of the carrier frame 22, wheel assemblies 46 and hydraulic cylinders 38 and 40, in which the wheel assemblies 46 are oriented to steer the agricultural implement 10 in a right turn. As illustrated, the wheel assemblies 46 are oriented at an angle 86 relative to the carrier frame 22. In the illustrated embodiment, the angle is approximately 25 degrees. In certain embodiments, the wheel assemblies 46 may be capable of rotating between approximately 30 degrees to the left and approximately 30 degrees to the right. In this manner, the hydraulic cylinders 38 and 40 may steer the implement 10 to a desired orientation based on user input or automatically based on a degree of rotation of the tow vehicle. As illustrated, because the wheel assemblies 46 are linked by the tie rod 44, the rotation angle 86 of each wheel assembly 46 relative to the carrier frame 22 is substantially equal.

Figure 9:
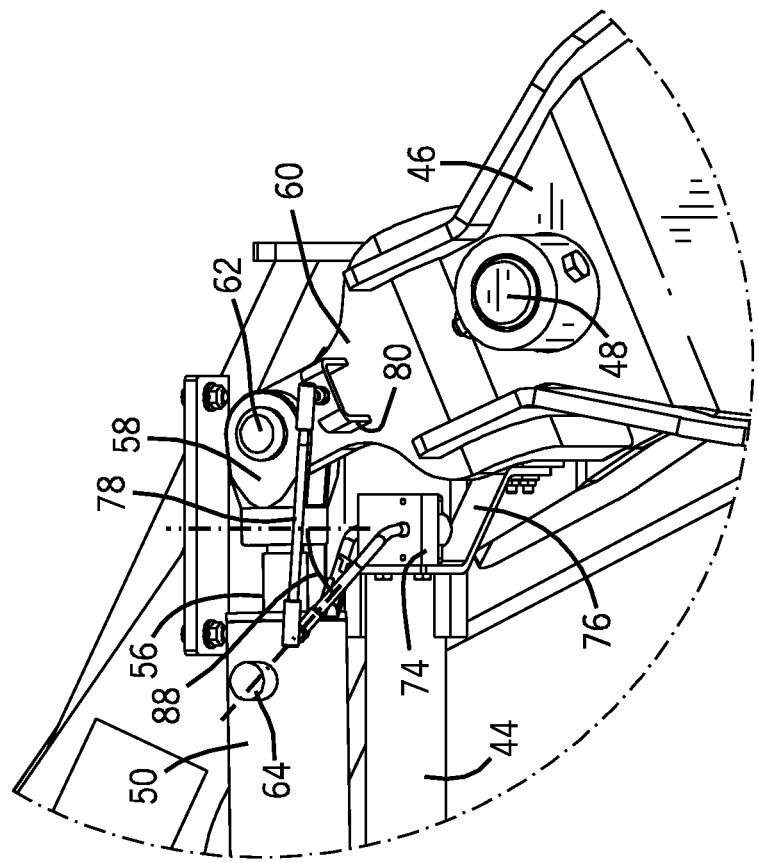
FIG. 9 is a detailed top view of the carrier frame, wheel assemblies and the second actuating cylinder, taken within line 9-9 of FIG. 8.

FIG. 9 is a detailed top view of the carrier frame 22, wheel assemblies 46 and second hydraulic cylinder 40 taken within line 9-9 of FIG. 8. As illustrated, when the implement 10 engages a right turn, the wheel assemblies 46 rotate in a counter-clockwise direction about the pivot joints 48. Consequently, the bracket 80 translates to the left, thereby inducing the linkage to rotate counter-clockwise with respect to the sensor 74. As illustrated, the linkage 78 forms an angle 88 with respect to the non-rotated orientation. The sensor 74 is configured to output a signal based on the angle 88 and indicative of the angle 86.

Figure 10:
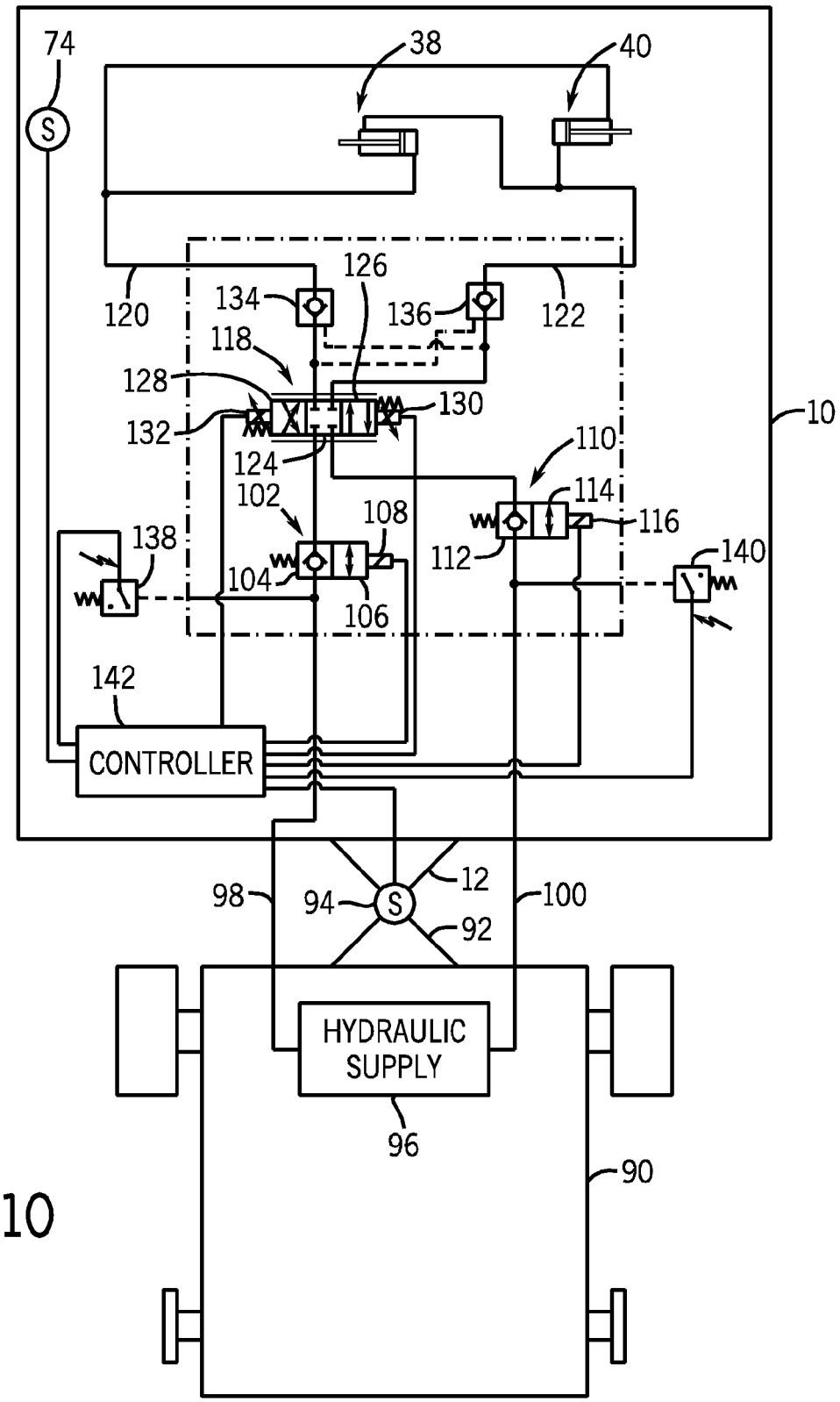
FIG. 10 is a schematic diagram of an exemplary hydraulic system configured to control the wheel assemblies by regulating fluid flow to the actuating cylinders.

FIG. 10 is a schematic diagram of an exemplary hydraulic system configured to control the wheel assemblies 46 by regulating fluid flow to the hydraulic cylinders 38 and 40. As previously discussed, the implement 10 is configured to be towed by a prime mover, such as the illustrated tractor 90. In the illustrated embodiment, the tow hitch 12 of the implement 10 is coupled to a corresponding hitch 92 of the tractor 90. The interface (e.g., ball, clevis, etc.) between hitches 12 and 92 facilitates rotational movement between the implement 10 and the tractor 90, thereby reducing the turning radius of the implement 10. As illustrated, an implement orientation sensor 94 is coupled to the tow hitch 12 and the corresponding tractor hitch 92. The sensor 94 is configured to measure the angle between the tractor 90 and the implement 10 (e.g., frame 22, mounting structure 16, etc.) such that the wheel assemblies 46 may be automatically rotated to a desired orientation. As will be appreciated, the sensor 94 may be a rotary potentiometer, a linear potentiometer, or any other device configured to output a signal indicative of the angle between the tractor 90 and the implement 10.

In the present embodiment, the tractor 90 includes a hydraulic supply 96 configured to supply pressurized hydraulic fluid to the hydraulic cylinders 38 and 40, and/or other hydraulic actuators within the implement 10. As illustrated, a first hydraulic conduit 98 and a second hydraulic conduit 100 extend between the hydraulic supply 96 and the implement 10. The hydraulic supply 96 is configured to selectively supply pressurized fluid to either the first conduit 98 or the second conduit 100. The conduit 98 or 100 not receiving pressurized fluid serves as a return to convey fluid back to the hydraulic supply. In certain embodiments, the hydraulic supply 96 includes a manually operated four-position valve configured to direct the pressurized fluid to either the first conduit 98 or the second conduit 100. For example, a first position of the valve may be configured to direct hydraulic fluid to the first conduit 98, a second position of the valve may be configured to direct hydraulic fluid to the second conduit 100, a third or neutral position may block hydraulic fluid flow to both conduits 98 and 100, and a fourth position may dump the hydraulic pressure. In such embodiments, an operator within the tractor 90 may control the flow of hydraulic fluid to the implement 10.

As illustrated, the first conduit 98 is coupled to a first selection control valve 102 within the implement 10. In the present embodiment, the first selection control valve 102 is a two-position/two-way hydraulic valve. The first position 104 is configured to block fluid flow from the hydraulic supply 96 to the hydraulic cylinders 38 and 40 while facilitating fluid flow from the cylinders 38 and 40 to the supply 96, and the second position 106 facilitates fluid flow in both directions. An electronic actuator 108 (e.g., solenoid) controls the position of the first selection control valve 102. Similarly, a second selection control valve 110 is coupled to the second conduit 100. In the present embodiment, the second selection control valve 110 is a two-position/two-way hydraulic valve. The first position 112 is configured to block fluid flow from the hydraulic supply 96 to the hydraulic cylinders 38 and 40 while facilitating fluid flow from the cylinders 38 and 40 to the supply 96, and the second position 114 facilitates fluid flow in both directions. An electronic actuator 116 (e.g., solenoid) controls the position of the second selection control valve 110.

As illustrated, both the first and second hydraulic conduits 98 and 100 extend from the first and second selection control valves 102 and 110 to a steering control valve 118. In addition, a third hydraulic conduit 120 extends between the steering control valve 118 and the hydraulic cylinders 38 and 40. Specifically, the third hydraulic conduit 120 is coupled to the cap side of the first hydraulic cylinder 38 and the rod side of the second hydraulic cylinder 40. In this configuration, when hydraulic fluid is supplied to the third hydraulic conduit 120, the cap side of the first cylinder 38 and the rod side of the second cylinder 40 are pressurized. Consequently, the piston rod of the first cylinder 38 extends and the piston rod of the second cylinder 40 retracts, thereby initiating a right turn. Similarly, a fourth hydraulic conduit 122 extends between the steering control valve 118 and the hydraulic cylinders 38 and 40. As illustrated, the fourth hydraulic conduit 122 is coupled to the cap side of the second hydraulic cylinder 40 and the rod side of the first hydraulic cylinder 38. In this configuration, when hydraulic fluid is supplied to the fourth hydraulic conduit 122, the cap side of the second cylinder 40 and the rod side of the first cylinder 38 are pressurized. Consequently, the piston rod of the second cylinder 40 extends and the piston rod of the first cylinder 38 retracts, thereby initiating a left turn.

In the present embodiment, the steering control valve 118 is a three-position/four-way hydraulic valve. The first position 124 blocks flow between the first and second hydraulic conduits 98 and 100 and the third and fourth hydraulic conduits 120 and 122, the second position 126 facilitates fluid flow between the first conduit 98 and the third conduit 120 and between the second conduit 100 and the fourth conduit 122, and the third position 128 facilitates fluid flow between the first conduit 98 and the fourth conduit 122 and between the second conduit 100 and the third conduit 120. The steering control valve 118 also includes two actuators 130 and 132 configured to adjust the position of the valve 118. In the present embodiment, the first actuator 130 is a solenoid configured to drive the steering control valve 118 to the second position 126, and the second actuator 132 is a solenoid configured to drive the valve 118 to the third position 128.

In the illustrated embodiment, the third hydraulic conduit 120 includes a first pilot operated check valve 134, and the fourth hydraulic conduit 122 includes a second pilot operated check valve 136. As will be appreciated, pilot operated check valves are configured to facilitate fluid flow in one direction, while blocking flow in the opposite direction. However, if a pilot line extending to the valve is pressurized, the valve will facilitate flow in both directions. In the present embodiment, the first pilot operated check valve 134 is configured to facilitate fluid flow from the steering control valve 118 to the hydraulic cylinders 38 and 40, while blocking fluid flow from the hydraulic cylinders 38 and 40 to the control valve 118. In addition, the pilot line of the first check valve 134 is in fluid communication with the fourth hydraulic conduit 122. In this configuration, if the fourth hydraulic conduit 122 is pressurized, the first pilot operated check valve 134 will facilitate fluid flow from the hydraulic cylinders 38 and 40 to the steering control valve 118.

Furthermore, the second pilot operated check valve 136 is configured to facilitate fluid flow from the steering control valve 118 to the hydraulic cylinders 38 and 40, while blocking fluid flow from the hydraulic cylinders 38 and 40 to the control valve 118. In addition, the pilot line of the second check valve 136 is in fluid communication with the third hydraulic conduit 120. In this configuration, if the third hydraulic conduit 120 is pressurized, the second pilot operated check valve 136 will facilitate fluid flow from the hydraulic cylinders 38 and 40 to the steering control valve 118. As discussed in detail below, the pilot operated check valves 134 and 136 serve to maintain fluid pressure within the hydraulic cylinders 38 and 40 while the steering control valve 118 is in the first position 124.

The illustrated implement 10 also includes a first pressure sensor 138 and a second pressure sensor 140. As illustrated, the first pressure sensor 138 is in fluid communication with the first hydraulic conduit 98, and the second pressure sensor 140 is in fluid communication with the second hydraulic conduit 100. As will be appreciated, the pressure sensors 138 and 140 may include any suitable pressure sensor configuration, such as a fiber optic sensor, a mechanical deflection sensor, a piezoelectric sensor, or a microelectromechanical systems (MEMS) sensor, among others. In certain embodiments, the pressure sensors 138 and 140 may be pressure switches configured to output a signal indicating whether each conduit 98 and 100 is pressurized or unpressurized. In the present embodiment, the pressure sensors 138 and 140 are communicatively coupled to a controller 142, and configured to output a signal indicative of pressure within the respective conduit. The controller 142 is also communicatively coupled to the sensor 74, the sensor 94, and the actuators 108, 116, 130 and 132.

The controller 142 is configured to operate the hydraulic system in one of three modes. The first mode locks the wheel assemblies into an orientation substantially aligned with the longitudinal axis of the implement 10. The second mode enables manual steering of the wheel assemblies via operator control of the hydraulic supply 96 within the tractor 90. The third mode automatically steers the wheels based on an orientation of the implement relative to the tractor 90. In certain embodiments, the mode of operation may be selected by an operator through a user interface within the tractor 90. In such embodiments, the user interface will be coupled to the controller 142 such that the controller 142 may control operation of the implement 10 based on the operator selected mode of operation.

If the first mode of operation is selected, the controller 142 will transition the steering control valve 118 to the first position 124 via operation of the actuators 130 and 132. The controller 142 will also transition the first selection control valve 102 to the first position 104 via operation of the actuator 108, and will transition the second selection control valve 110 to the first position 112 via operation of the actuator 116. With the first and second selection control valves 102 and 110 in their respective first positions 104 and 112, fluid flow from the hydraulic supply 96 to the hydraulic cylinders 38 and 40 will be blocked. In addition, the first position 124 of the steering control valve 118 blocks fluid flow between the first and second conduits 98 and 100 and the third and fourth conduits 120 and 122. As a result, fluid flow into and out of the hydraulic cylinders 38 and 40 will be substantially blocked.

However, if the wheels encounter variations in the terrain (e.g., trenches, rocks, clods, etc.), the wheel assemblies will be driven to rotate. Consequently, fluid pressure may build within the cap side or rod side of the cylinders 38 and 40. In certain embodiments, the first position of the steering control valve 118 may not provide a sufficient seal to block fluid flow from the cylinders 38 and 40. As a result, the wheel assemblies may oscillate as the implement 10 is pulled through a field. Consequently, the illustrated pilot operated check valves 134 and 136 are configured to substantially block fluid flow from the cylinders 38 and 40 while the hydraulic system is in the first mode of operation, thereby holding the wheel assemblies in the desired orientation. Specifically, because the steering control valve 118 is in the first position 124, the hydraulic conduits 120 and 122 will be substantially unpressurized. As a result, the pilot operated check valves 134 and 136 will block fluid flow from the conduits 120 and 122 to the conduits 98 and 100. Such a configuration may hold the wheel assemblies in an orientation substantially aligned with the longitudinal axis of the implement 10 despite variations in the terrain.

If the second mode of operation is selected, the controller 142 will transition the steering control valve 118 to the second position 126 via activation of the first actuator 130. The controller 142 will also transition the first selection control valve 102 to the second position 106 via activation of the actuator 108, and will transition the second selection control valve 110 to the second position 114 via activation of the actuator 116. With the first and second selection control valves 102 and 110 in their respective second positions 106 and 114, fluid may flow between the hydraulic supply 96 and the steering control valve 118. In addition, the second position 126 of the steering control valve 118 facilitates fluid flow between the first conduit 98 and the third conduit 120, and between the second conduit 100 and the fourth conduit 122. As a result, fluid may flow from the hydraulic supply 96 to the cylinders 38 and 40, thereby facilitating manual steering of the wheel assemblies. In alternative embodiments, the controller 142 may transition the steering control valve 118 to the third position 128, thereby establishing a fluid connection between the first conduit 98 and the fourth conduit 122, and between the second conduit 100 and the third conduit 120.

As previously discussed, a left turn may be initiated by extending the piston rod of the second hydraulic cylinder 40 and retracting the piston rod of the first hydraulic cylinder 38, thereby inducing the wheel assemblies to rotate in a clockwise direction. With the selection control valves 102 and 110 in their respective second positions 106 and 114 and the steering control valve 118 in the second position 126, a fluid connection is established between the second hydraulic conduit 100 and the cap side of the second hydraulic cylinder 40 and the rod side of the first hydraulic cylinder 38. Consequently, pressurizing the second hydraulic conduit 100 provides fluid to the cap side of the second cylinder 40 and the rod side of the first cylinder 38. As a result, the piston rod of the second cylinder 40 will extend and the piston rod of the first cylinder 38 will retract, thereby initiating a left turn.

In addition, a fluid connection is established between the first hydraulic conduit 98 and the cap side of the first hydraulic cylinder 38 and the rod side of the second hydraulic cylinder 40. Therefore, as the piston rod of the second hydraulic cylinder 40 extends, fluid will flow from the rod side of the cylinder 40 toward the hydraulic supply 96. Furthermore, as the piston rod of the first hydraulic cylinder 38 retracts, fluid will flow from the cap side of the cylinder 38 toward the hydraulic supply 96. With the fourth hydraulic conduit 122 pressurized, the first pilot operated check valve 134 will facilitate fluid flow from the cylinders 38 and 40 to the steering control valve 118, thereby enabling the hydraulic fluid to return to the hydraulic supply 96 via the first conduit 98. Consequently, pressurizing the second hydraulic conduit 100 and enabling fluid to return through the first conduit 98 induces the implement to initiate a left turn.

Conversely, a right turn may be initiated by extending the piston rod of the first hydraulic cylinder 38 and retracting the piston rod of the second hydraulic cylinder 40, thereby inducing the wheel assemblies to rotate in a counter-clockwise direction. With the selection control valves 102 and 110 in their respective second positions 106 and 114 and the steering control valve 118 in the second position 126, a fluid connection is established between the first hydraulic conduit 98 and the cap side of the first hydraulic cylinder 38 and the rod side of the second hydraulic cylinder 40. Consequently, pressurizing the first hydraulic conduit 98 provides fluid to the cap side of the first cylinder 38 and the rod side of the second cylinder 40. As a result, the piston rod of the first cylinder 38 will extend and the piston rod of the second cylinder 40 will retract, thereby initiating a right turn.

In addition, a fluid connection is established between the second hydraulic conduit 100 and the cap side of the second hydraulic cylinder 40 and the rod side of the first hydraulic cylinder 38. Therefore, as the piston rod of the first hydraulic cylinder 38 extends, fluid will flow from the rod side of the cylinder 38 toward the hydraulic supply 96. Furthermore, as the piston rod of the second hydraulic cylinder 40 retracts, fluid will flow from the cap side of the cylinder 40 toward the hydraulic supply 96. With the third hydraulic conduit 120 pressurized, the second pilot operated check valve 136 will facilitate fluid flow from the cylinders 38 and 40 to the steering control valve 118, thereby enabling the hydraulic fluid to return to the hydraulic supply 96 via the second conduit 100. Consequently, pressurizing the first hydraulic conduit 98 and enabling fluid to return through the second conduit 100 induces the implement to initiate a right turn. Conversely, if the controller 142 transitions the steering control valve 118 to the third position 128, a left turn may be initiated by applying fluid pressure to the first conduit 98 and a right turn may be initiated by applying fluid pressure to the second conduit 100.

In certain embodiments, the controller 142 may be configured to automatically transition the wheel assemblies to an orientation substantially aligned with the longitudinal axis of the implement 10. For example, after an operator has completed a turn, the operator may manually instruct the controller 142 to automatically center the wheel assemblies via a switch within the tractor 90. In this manner, the wheel assemblies will automatically rotate into alignment with the longitudinal axis of the implement 10 without further operator input. In further embodiments, the controller 142 may be configured to automatically center the wheel assemblies if a speed of the implement 10 exceeds a threshold valve. For example, if the speed of the implement 10 exceeds 4, 6, 7, 8, 9, 10, 11, 12, 14, 16 miles per hours, or more, the controller 142 may automatically transition the wheel assemblies to an orientation substantially aligned with the longitudinal axis of the implement 10. Such a configuration may ensure that the operator does not attempt to manually steer the implement at a speed that may destabilize the implement 10.

Once automatic wheel centering has been initiated, the controller 142 will determine whether the first hydraulic conduit 98 or the second hydraulic conduit 100 is pressurized. As previously discussed, the first pressure sensor 138 is configured to output a signal indicative of the pressure within the first conduit 98, and the second pressure sensor 140 is configured to output a signal indicative of the pressure within the second conduit 100. By comparing the fluid pressure within the first conduit 98 and within the second conduit 100, the controller 142 will determine which conduit is pressurized by selecting the conduit with the higher pressure. Next, the controller 142 will determine the angle of the wheel assemblies relative to the carrier frame via input from the sensor 74. Based on the measured angle of the wheel assemblies and identification of the pressurized conduit, the controller 142 will adjust the steering control valve 118 and the selection control valves 102 and 110 to automatically center the wheels.

Specifically, the controller 142 will transition the selection control valve coupled to the pressurized conduit to the second position. For example, if the first conduit 98 is pressurized, the controller 142 will transition the first selection control valve 102 to the second position 106 to facilitate fluid flow from the hydraulic supply 96 to the steering control valve 118. Alternatively, if the second conduit 100 is pressurized, the controller 142 will transition the second selection control valve 110 to the second position 114 to facilitate fluid flow from the hydraulic supply 96 to the steering control valve 118. In addition, the controller 142 will transition the selection control valve coupled to the unpressurized conduit to the first position. As previously discussed, the first position of each selection control valve is configured to block fluid flow from the hydraulic supply 96 to the hydraulic cylinders 38 and 40, while facilitating fluid flow from the cylinders 38 and 40 to the supply 96. Consequently, if the first conduit 98 is unpressurized, the first position 104 of the first selection control valve 102 will enable fluid to return to the hydraulic supply 96. Similarly, if the second conduit 100 is unpressurized, the first position 112 of the second selection control valve 110 will enable fluid to return to the hydraulic supply 96.

The controller 142 will then adjust the position of the steering control valve 118 to automatically align the wheel assemblies with the longitudinal axis of the implement 10. For example, if the sensor 74 indicates that the wheel assemblies are oriented to steer the agricultural implement 10 in a left turn, as shown in FIG. 6, the controller 142 will rotate the wheel assemblies in a counter-clockwise direction. As previously discussed, a counter-clockwise rotation will be induced by extending the piston rod of the first hydraulic cylinder 38 and retracting the piston rod of the second hydraulic cylinder 40. Accordingly, the controller 142 will adjust the steering control valve 118 such that fluid is provided to the third conduit 120, and fluid returns through the fourth conduit 122. For example, if the first conduit 98 is pressurized and the second conduit 100 is unpressurized, the controller 142 will adjust the steering control valve 118 such that a fluid connection is established between the first conduit 98 and the third conduit 120, and between the second conduit 100 and the fourth conduit 122. Such fluid connections will be established by activating the first actuator 130, thereby driving the steering control valve 118 to the second position 126. Once the sensor 74 indicates that the wheel assemblies are substantially aligned with the longitudinal axis of the implement 10, the controller 142 will transition the steering control valve 118 to the first position 124 to block fluid flow between the conduits 98 and 100 and the conduits 120 and 122. In addition, the controller 142 will transition both selection control valves 102 and 110 to their respective first positions 104 and 112.

Conversely, if the second conduit 100 is pressurized and the first conduit 98 is unpressurized, the controller 142 will adjust the steering control valve 118 such that a fluid connection is established between the second conduit 100 and the third conduit 120, and between the first conduit 98 and the fourth conduit 122. Such fluid connections will be established by activating the second actuator 132, thereby driving the steering control valve 118 to the third position 128. Furthermore, if the sensor 74 indicates that the wheel assemblies are oriented to steer the agricultural implement 10 in a right turn, as shown in FIG. 8, the controller 142 will rotate the wheel assemblies in a clockwise direction. As previously discussed, a clockwise rotation will be induced by retracting the piston rod of the first hydraulic cylinder 38 and extending the piston rod of the second hydraulic cylinder 40. Accordingly, the controller 142 will adjust the steering control valve 118 such that fluid is provided to the fourth conduit 122, and fluid returns through the third conduit 120.

As will be appreciated, the rotation rate of the wheel assemblies is at least partially dependent on the fluid pressure driving the hydraulic cylinders 38 and 40. For example, a higher fluid pressure may induce the wheel assemblies to rotate faster than a lower fluid pressure. In certain embodiments, the hydraulic supply 96 is configured to vary the fluid pressure to the implement 10, thereby establishing a desired rotation rate. In alternative embodiments, the fluid pressure may be regulated by the steering control valve 118. For example, the steering control valve 118 may be a proportional control valve configured to adjust a flow rate of fluid through the second position 126 and the third position 128 to control a rotation rate of the wheel assemblies. Such embodiments may enable the controller 142 to establish a substantially smooth transition between the rotated and centered positions of the wheel assemblies.

If the third mode of operation is selected, the controller 142 will automatically steer the wheels based on an orientation of the implement relative to the tractor 90. As previously discussed, the sensor 94 is coupled to the tow hitch 12 and the corresponding tractor hitch 92, and configured to measure the angle between the tractor 90 and the implement 10. Furthermore, the sensor 74 is configured to detect an angle of the wheel assemblies relative to the carrier frame. Based on input from the sensors 74 and 94, the controller 142 may automatically adjust the orientation of the wheel assemblies to facilitate tighter turns during transport and/or reduce drift during seeding or planting operations. For example, the controller 142 may be configured to adjust the angle of the wheel assemblies such that the wheels remain substantially parallel to the longitudinal axis of the tractor 90 despite rotation of the implement 10 relative to the tractor 90. In such a configuration, the controller 142 may rotate the wheel assemblies in the opposite direction of implement rotation. However, it should be appreciated that the controller 142 may be configured to automatically steer the wheel assemblies toward other desired targets in alternative embodiments.

In the present embodiments, the controller 142 may maintain the wheel assemblies in an orientation substantially parallel to the longitudinal axis of the tractor 90 by comparing the angle of the implement 10 relative to the tractor 90 with the angle of the wheel assemblies relative to the implement. As will be appreciated, to maintain this parallel wheel orientation, the magnitude of wheel assembly rotation will be substantially equal to the magnitude of implement rotation, but the rotations will be in opposite directions. For example, if the implement 10 is rotated 3 degrees clockwise, the wheel assemblies may be rotated 3 degrees counter-clockwise to maintain the parallel orientation with the tractor 90. Consequently, the controller 142 is configured to steer the wheel assemblies such that the angle of the wheel assemblies relative to the carrier frame is substantially opposite from the angle of the implement 10 relative to the tractor 90.

By way of example, if the implement 10 is rotated 3 degrees clockwise relative to the tractor 90 and the wheel assemblies are oriented 2 degrees counter-clockwise relative to the carrier frame, the controller 142 will rotate the wheel assemblies 1 degree counter-clockwise to properly align the wheel assemblies with the longitudinal axis of the tractor 90. As previously discussed, counter-clockwise rotation of the wheel assemblies is associated with inducing a right turn. To induce the counter-clockwise rotation, the controller 142 will first determine whether the first hydraulic conduit 98 or the second hydraulic conduit 100 is pressurized. As previously discussed, the first pressure sensor 138 is configured to output a signal indicative of the pressure within the first conduit 98, and the second pressure sensor 140 is configured to output a signal indicative of the pressure within the second conduit 100. By comparing the fluid pressure within the first conduit 98 and the second conduit 100, the controller 142 will determine which conduit is pressurized by selecting the conduit with the higher pressure. Next, the controller 142 will adjust the steering control valve 118 and the appropriate selection control valve 102 or 110 to automatically steer the wheels to the desired orientation (e.g., 3 degrees counter-clockwise).

Similar to the automatic wheel centering described above, the controller 142 will transition the selection control valve coupled to the pressurized conduit to the second position. For example, if the first conduit 98 is pressurized, the controller 142 will transition the first selection control valve 102 to the second position 106 to facilitate fluid flow from the hydraulic supply 96 to the steering control valve 118. Alternatively, if the second conduit 100 is pressurized, the controller 142 will transition the second selection control valve 110 to the second position 114 to facilitate fluid flow from the hydraulic supply 96 to the steering control valve 118. In addition, the controller 142 will transition the selection control valve coupled to the unpressurized conduit to the first position. As previously discussed, the first position of each selection control valve is configured to block fluid flow from the hydraulic supply 96 to the hydraulic cylinders 38 and 40, while facilitating fluid flow from the cylinders 38 and 40 to the supply 96. Consequently, if the first conduit 98 is unpressurized, the first position 104 of the first selection control valve 102 will enable fluid to return to the hydraulic supply 96. Similarly, if the second conduit 100 is unpressurized, the first position 112 of the second selection control valve 110 will enable fluid to return to the hydraulic supply 96.

The controller 142 will then adjust the position of the steering control valve 118 to automatically steer the wheel assemblies to the desired 3 degree counter-clockwise orientation. As previously discussed, a counter-clockwise rotation will be induced by extending the piston rod of the first hydraulic cylinder 38 and retracting the piston rod of the second hydraulic cylinder 40. Accordingly, the controller 142 will adjust the steering control valve 118 such that fluid is provided to the third conduit 120, and fluid returns through the fourth conduit 122. For example, if the first conduit 98 is pressurized and the second conduit 100 is unpressurized, the controller 142 will adjust the steering control valve 118 such that a fluid connection is established between the first conduit 98 and the third conduit 120, and between the second conduit 100 and the fourth conduit 122. Such fluid connections will be established by activating the first actuator 130, thereby driving the steering control valve 118 to the second position 126. Once the sensor 74 indicates that the wheel assemblies are oriented at the desired 3 degree angle, the controller 142 will transition the steering control valve 118 to the first position 124 to block fluid flow between the conduits 98 and 100 and the conduits 120 and 122. In addition, the controller 142 will transition both selection control valves 102 and 110 to their respective first positions 104 and 112.

Conversely, if the second conduit 100 is pressurized and the first conduit 98 is unpressurized, the controller 142 will adjust the steering control valve 118 such that a fluid connection is established between the second conduit 100 and the third conduit 120, and between the first conduit 98 and the fourth conduit 122. Such fluid connections will be established by activating the second actuator 132, thereby driving the steering control valve 118 to the third position 128. Furthermore, if a clockwise rotation is desired, the controller 142 will retract the piston rod of the first hydraulic cylinder 38 and will extend the piston rod of the second hydraulic cylinder 40. Accordingly, the controller 142 will adjust the steering control valve 118 such that fluid is provided to the fourth conduit 122, and fluid returns through the third conduit 120.

Similar to the manual steering mode described above, the controller 142 may be configured to automatically center the wheel assemblies if a speed of the implement 10 exceeds a threshold value. For example, if the speed of the implement 10 exceeds 4, 6, 7, 8, 9, 10, 11, 12, 14, 16 miles per hours, or more, the controller 142 may automatically transition the wheel assemblies to an orientation substantially aligned with the longitudinal axis of the implement 10. Such a configuration may ensure that the controller 142 does not attempt to automatically steer the implement 10 at a speed that may destabilize the implement 10.

In certain embodiments, a known conduit 98 or 100 will be pressurized during the third mode of operation, thereby obviating the step of determining which conduit is pressurized. For example, as previously discussed, the hydraulic supply 96 may include a four-position valve configured to direct pressurized fluid to either the first conduit 98 or the second conduit 100. Consequently, the operator may transition the four-position valve to a first position that supplies hydraulic fluid to the first conduit 98 prior to engaging the third mode of operation. In such a configuration, the controller 142 may automatically steer the wheels based on the known pressurized conduit 98.

In addition, the controller 142 may be configured to warn the operator and/or disable automatic steering if the fluid pressure within the first conduit 98 or the second conduit 100 is insufficient to facilitate rotation of the wheel assemblies. For example, the controller 142 may monitor the pressure within the first conduit 98 via the pressure sensor 138 and within the second conduit 100 via the pressure sensor 140. If both pressures are below a first threshold value, the controller 142 may send a signal to a user interface within the tractor 90 indicating that additional fluid pressure should be provided. Furthermore, if both pressures are below a second threshold value, lower than the first threshold value, the controller 142 may disable automatic steering of the implement 10. In alternative embodiments, the pressure sensors 138 and 140 may be pressure switches configured to send a signal to the controller 142 if the detected pressure drops below a threshold value. In such embodiments, the controller 142 may warn the operator and/or disable automatic steering if the pressure within both conduits 98 and 100 is below the threshold value.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement system, comprising:
   a first actuating cylinder configured to rotate a first wheel assembly relative to an implement frame;
   a second actuating cylinder configured to rotate a second wheel assembly relative to the implement frame;
   a first fluid conduit configured to supply or return fluid;
   a second fluid conduit configured to supply or return fluid;
   a first pressure sensor in fluid communication with the first fluid conduit, wherein the first pressure sensor is configured to output a first signal indicative of a pressure within the first fluid conduit;
   a second pressure sensor in fluid communication with the second fluid conduit, wherein the second pressure sensor is configured to output a second signal indicative of a pressure within the second fluid conduit;
   a valve in fluid communication with the first and second actuating cylinders and the first and second fluid conduits, wherein the valve is configured to control fluid flow from the first and second fluid conduits to the first and second actuating cylinders; and
   a controller communicatively coupled to the first and second pressure sensors and to the valve, wherein the controller is configured to determine whether the first fluid conduit or the second fluid conduit is supplying fluid to the valve based on the first signal and the second signal, and to control fluid flow between the first and second fluid conduits and the first and second actuating cylinders such that the first and second wheel assemblies are rotated based on a speed of the implement system.

2. The agricultural implement system of claim 1, wherein the controller is configured to control fluid flow between the first and second fluid conduits and the first and second actuating cylinders such that the first and second wheel assemblies are rotated into alignment with a longitudinal axis of the implement frame if the speed of the implement system exceeds a threshold speed.

3. The agricultural implement system of claim 1, comprising:
   a third fluid conduit extending to a cap side of the first actuating cylinder and a rod side of the second actuating cylinder; and
   a fourth fluid conduit extending to a cap side of the second actuating cylinder and a rod side of the first actuating cylinder;
   wherein the valve comprises a three-position valve having a first position configured to block fluid flow between the first and second fluid conduits and the third and fourth fluid conduits, a second position configured to facilitate fluid flow between the first fluid conduit and the third fluid conduit and between the second fluid conduit and the fourth fluid conduit, and a third position configured to facilitate fluid flow between the first fluid conduit and the fourth fluid conduit and between the second fluid conduit and the third fluid conduit.

4. The agricultural implement system of claim 3, wherein the controller is configured to hold the three-position valve in the second position or the third position such that fluid flow to the first and second actuating cylinders is controlled by fluid flow through the first and second fluid conduits.

5. The agricultural implement system of claim 1, comprising an implement orientation sensor configured to measure an angle between the implement frame and a tow vehicle, and to output a third signal indicative of the angle.

6. The agricultural implement system of claim 5, wherein the controller is configured to automatically control fluid flow to the first and second actuating cylinders based on the third signal such that the first and second wheel assemblies are rotated to a desired orientation with respect to the implement frame.

7. The agricultural implement system of claim 2, comprising:
   a first selection control valve in fluid communication with the first fluid conduit, wherein the first selection control valve includes a first position configured to block fluid flow toward the valve and to facilitate fluid flow away from the valve, and a second position configured to facilitate fluid flow through the first selection control valve; and
   a second selection control valve in fluid communication with the second fluid conduit, wherein the second selection control valve includes a first position configured to block fluid flow toward the valve and to facilitate fluid flow away from the valve, and a second position configured to facilitate fluid flow through the second selection control valve.

8. The agricultural implement system of claim 7, wherein the controller is configured to transition each selection control valve to the first position after the first and second wheel assemblies are aligned with the longitudinal axis of the implement frame.

9. The agricultural implement system of claim 7, wherein the controller is configured to transition each selection control valve to the second position if the speed of the implement system is below the threshold speed and a manual mode of operation has been initiated.

10. The agricultural implement system of claim 7, wherein the controller is configured to transition the first selection control valve to the second position and the second selection control valve to the first position if the first fluid conduit is supplying fluid to the valve, and to transition the first selection control valve to the first position and the second selection control valve to the second position if the second fluid conduit is supplying fluid to the valve.

11. The agricultural implement system of claim 3, comprising:
a first pilot operated check valve coupled to the third fluid conduit, wherein the first pilot operated check valve is configured to block fluid flow from the first and second actuating cylinders to the valve unless the fourth fluid conduit is pressurized; and
a second pilot operated check valve coupled to the fourth fluid conduit, wherein the second pilot operated check valve is configured to block fluid flow from the first and second actuating cylinders to the valve unless the third fluid conduit is pressurized.

12. An agricultural implement system, comprising:
a first actuating cylinder configured to rotate a first wheel assembly relative to an implement frame;
a second actuating cylinder configured to rotate a second wheel assembly relative to the implement frame;
a first fluid conduit configured to supply or return fluid;
a second fluid conduit configured to supply or return fluid;
a third fluid conduit extending to a cap side of the first actuating cylinder and a rod side of the second actuating cylinder;
a fourth fluid conduit extending to a cap side of the second actuating cylinder and a rod side of the first actuating cylinder;
a three-position valve having a first position configured to block fluid flow between the first and second fluid conduits and the third and fourth fluid conduits, a second position configured to facilitate fluid flow between the first fluid conduit and the third fluid conduit and between the second fluid conduit and the fourth fluid conduit, and a third position configured to facilitate fluid flow between the first fluid conduit and the fourth fluid conduit and between the second fluid conduit and the third fluid conduit; and
a controller communicatively coupled to the three-position valve, wherein the controller is configured to transition the three-position valve to the second position or the third position to adjust fluid flow to the first and second actuating cylinders such that the first and second wheel assemblies are rotated into alignment with a longitudinal axis of the implement frame if a speed of the implement system exceeds a threshold speed, and to transition the three-position valve to the first position after the first and second wheel assemblies are aligned with the longitudinal axis of the implement frame.

13. The agricultural implement system of claim 12, wherein the three-position valve is a proportional control valve configured to adjust a flow rate of fluid through the second position and the third position to regulate a rotation rate of the first and second wheel assemblies.

14. The agricultural implement system of claim 12, comprising:
a first pressure sensor in fluid communication with the first fluid conduit, wherein the first pressure sensor is configured to output a first signal indicative of a pressure within the first fluid conduit; and
a second pressure sensor in fluid communication with the second fluid conduit, wherein the second pressure sensor is configured to output a second signal indicative of a pressure within the second fluid conduit;
wherein the controller is configured to determine whether the first fluid conduit or the second fluid conduit is supplying fluid to the three-position valve based on the first and second signals.

15. The agricultural implement system of claim 14, wherein the controller is configured to transition the three-position valve to the first position if a pressure within the first fluid conduit and a pressure within the second fluid conduit are below a threshold pressure.

16. The agricultural implement system of claim 12, wherein the controller is configured to automatically control fluid flow to the first and second actuating cylinders based on an angle of the implement frame relative to a tow vehicle such that the first and second wheel assemblies are rotated to a desired orientation with respect to the implement frame.

17. An agricultural implement system, comprising:
a first actuating cylinder configured to rotate a first wheel assembly relative to an implement frame;
a second actuating cylinder configured to rotate a second wheel assembly relative to the implement frame;
a first fluid conduit configured to supply or return fluid;
a second fluid conduit configured to supply or return fluid;
a first pressure sensor in fluid communication with the first fluid conduit, wherein the first pressure sensor is configured to output a first signal indicative of a pressure within the first fluid conduit;
a second pressure sensor in fluid communication with the second fluid conduit, wherein the second pressure sensor is configured to output a second signal indicative of a pressure within the second fluid conduit;
a valve in fluid communication with the first and second actuating cylinders and the first and second fluid conduits, wherein the valve is configured to control fluid flow from the first and second fluid conduits to the first and second actuating cylinders; and
a controller communicatively coupled to the first and second pressure sensors and to the valve, wherein the controller is configured to determine whether the first fluid conduit or the second fluid conduit is supplying fluid to the valve based on the first and second signals, and to automatically control fluid flow to the first and second actuating cylinders such that the first and second wheel assemblies are rotated to a desired angle relative to the implement frame.

18. The agricultural implement system of claim 17, wherein the controller is configured to control fluid flow to the first and second actuating cylinders such that the first and second wheel assemblies are rotated into alignment with a longitudinal axis of the implement frame if a speed of the implement system exceeds a threshold speed.

19. The agricultural implement system of claim 17, wherein the controller automatically controls fluid flow to the first and second actuating cylinders based on an angle of the implement frame relative to a tow vehicle.

20. The agricultural implement system of claim 17, wherein the controller is configured to hold the valve in a position that establishes fluid communication between the first and second fluid conduits and the first and second actuating cylinders such that fluid flow to the first and second actuating cylinders is controlled by fluid flow through the first and second fluid conduits.

* * * * *